Patented Sept. 24, 1946

2,408,215

UNITED STATES PATENT OFFICE 2,408,215

CATALYST PRODUCTION

George H. Keating, Port Arthur, Tex., assignor to The Texas Company, New York, N. Y., a corporation of Delaware No Drawing. Application February 11, 1944, Serial No. 521,975

8 Claims. (Cl. 252—259.2)

The present invention relates to the preparation of catalysts, especially inorganic gel catalysts such as those containing a substantial proportion of silica gel, i. e., catalysts which are referred to in the art as silica gel catalysts. The invention especially relates to a process of preparing inorganic gel catalysts in desired physical form such as in the form of pellets or rings.

In many fields, particularly in the field of catalytic reactions resulting in the conversion of hydrocarbons to hydrocarbons of increased value as motor fuel, such as catalytic cracking, reforming, isomerization, polymerization and the like, catalysts have been employed in fixed beds. In an operation in which a catalyst is disposed in a fixed bed the catalyst is ordinarily employed in the form of pellets, pieces or the like. Often the cost of preparing the catalysts in the form of pellets represents an important part of the cost of manufacturing the catalysts.

During conversion reactions such as catalytic cracking the catalyst becomes contaminated with coke-like material and, in order that the catalyst may be used for additional conversion, it is necessary that the catalyst be regenerated. For example, in the catalytic cracking of petroleum oils ordinarily the oil to be cracked is heated and vaporized, and the hot vapors are brought into contact with a solid catalyst under controlled conditions of temperature and pressure; for example, at a temperature of 700 to 1100° F. and at atmospheric pressure or a pressure of 100 pounds per square inch or higher. Reaction products, including gas, gasoline hydrocarbons and higher boiling hydrocarbons are separated in conventional ways. When regeneration is necessary, this may be accomplished by burning off the carbon or coke with a stream of an oxygen-containing gas. The regenerated catalyst may be used in cracking additional quantities of oil. Thus, a useful catalyst must be capable of being repeatedly regenerated.

An important class of catalysts is prepared from inorganic gels (i. e., true gels in the technical sense or gelatinous precipitates). Particularly valuable members of this class are the catalysts prepared to contain a substantial proportion of silica and/or alumina gels, especially combinations of the two. Combination silica-alumina gel catalysts may be prepared by co-precipitating hydrated silica and alumina gels and drying the resulting mixed gel, by separately precipitating the silica gel and the alumina gel and then mixing the precipitates in wet condition or by first preparing one of the gels and precipitating the other gel in the presence thereof. Catalysts of this class are more fully disclosed in U. S. Patent No. 2,229,353 to C. L. Thomas et al.

Other metallic oxides may be included in the silica alumina catalysts. For example, valuable catalysts of this class which contain zirconia are disclosed in British Patent 534,121.

To prepare inorganic gel catalysts in the form of pieces, pellets or the like, it has usually been the practice to dry the gel incompletely and then to mix a small proportion of an organic lubricant or pelleting aid with the partially dried gel. The resulting mixture is then formed into the desired shapes and is calcined at an elevated temperature; for example, 900 to 1200° F.

When preparing catalyst pellets in accordance with this prior practice, the drying of the gel has usually been carried out so as to reduce the moisture content to a content of the order of 20 per cent. A material of this type appears substantially dry and is usually in the form of a powder. To pellet this material it has been the practice to add an organic pelleting aid such as a mixture of stearic acid and flour in an amount equal to about 6 per cent or less of the weight of the gel and then to form the mixture into pellets by means of a pelleting machine which operates in a manner similar to machines used for the manufacture of medicinal tablets. Thus the mixture is introduced into small dies and a punch compresses the pellets to the desired hardness. After calcining, catalysts are obtained which are satisfactory from a functional standpoint, but the manufacturing costs are high.

It has also been proposed to prepare catalyst pellets by extruding the moist catalyst gel. This has not proved satisfactory, however, because the extrusion has not proceeded easily and glassy pellets are obtained which are less active than pellets prepared in the manner above described and are difficult to regenerate.

It is an object of the invention to prepare inorganic gel catalysts in the form of pellets or rings and the like in an economical and simple manner and such that active products, capable of regeneration are obtained by conventional methods.

Another object of the invention is to provide a process for preparing inorganic gel catalysts in the form of pellets, rings, or other desired shapes which are initially active, structurally strong, and capable of repeated regeneration.

A further object of the invention is to provide an improved process for preparing catalysts comprising synthetic combinations of silica and alustrains in the rings is avoided. The predried rings are then oven-dried at about 225° to 250° F. for about 12 hours and are then calcined. The calcination is carried out by heating the rings slowly to about 1450° F. while passing air in contact with the rings at a rate of about 0.5 cu. ft. per hour per pound of catalyst. The calcination requires from 12 to 24 hours.

Catalysts prepared as described in Example II were tested as to initial activity as cracking catalysts and as to activity after regeneration. A virgin Oklahoma gas oil was cracked in the tests which were carried out by passing vapors of the gas oil at a temperature of about 950° F. into contact with the catalyst contained in a reactor also maintained at a temperature of about 950° F. at a space velocity of about 4:1 (4 liquid volumes of gas oil per volume of catalyst per hour). The products were collected and separated and the yields of 400° F. E. P. naphtha, total $C_4$ retention, were determined in terms of volume per cent basis charge.

Also, a separate investigation was made with respect to the breakage of the rings which took place before and during the calcining. The rings were about ⅜ inch in diameter and about ⅜ inch in length and had a wall thickness of about 1/32 inch.

The results obtained are given in the following table:

| Per cent by weight starch or flour in dry catalyst gel | Naphtha yield, volume per cent | | Per cent by weight whole rings after calcining | Per cent by weight of catalyst product-rings and pieces larger than 4-mesh |
|---|---|---|---|---|
| | Initial | Regenerated | | |
| 20% starch | 20.2 | 18.7 | 90.5 | 96.0 |
| 30% starch | 21.2 | 21.3 | 93.4 | 96.0 |
| 60% starch | 23.3 | 26.1 | 88.1 | 94.5 |
| 70% starch | 27.7 | 29.5 | 97.3 | 98.4 |
| 100% starch | 25.8 | 26.2 | 44.3 | 56.5 |
| 20% flour | 24.3 | 21.9 | 84.9 | 94.1 |
| 30% flour | 26.5 | 26.2 | 87.6 | 94.1 |
| 40% flour | 25.5 | 24.4 | 95.3 | 98.5 |
| 50% flour | 24.0 | 23.7 | 96.2 | 98.3 |
| 60% flour | 27.7 | 26.0 | 93.6 | 97.1 |
| 70% flour | 24.5 | 23.5 | 96.0 | 98.0 |

These results show that the catalysts possess excellent activity and that they are capable of entirely satisfactory regeneration. While the catalysts containing 20% starch or flour are satisfactory, their activity after regeneration is less in proportion to their initial activity than similar catalysts containing a greater quantity of organic material. In continuous runs in which the yields obtained were comparable to those given above, using catalysts containing 30% starch and 40% and 70% flour, it was found that during use, the catalyst containing 70% flour tended to produce fines to a greater extent than the other catalysts. On the basis of all of these results, it is preferred to use about 40% of a starch, preferably wheat flour, in practicing the present process.

It will be understood that the foregoing examples are merely illustrative of the invention and that the invention may be carried into effect in other ways. Thus, other inorganic gel catalysts, that is catalysts which are predominantly inorganic gels, may be substituted for the catalysts treated in the example, since the physical characteristics of the catalysts, rather than the specific chemical constituents are believed to be determinative of whether the catalysts may be prepared by the present process. The more important silica gel catalysts also contain alumina and may contain another catalytic material, as previously indicated. In such catalysts, the silica preferably constitutes a major proportion of the catalysts, and in the more valuable catalysts, the silica constitutes at least 70 per cent and may constitute up to 99 per cent by weight of the catalyst mixture, although 94 per cent is the preferred upper limit.

As other substances which may be used in silica gel catalysts in place of or in addition to the alumina and/or the zirconia, there may be mentioned a wide variety of metallic oxides which have been disclosed in the literature on the subject, including the oxides of metals from groups II and VIII of the periodic table, the particular oxide or oxides selected being dependent upon the reaction in which the catalyst is to be used.

In connection with the silica-alumina catalysts with or without another metal oxide, it may be of advantage to point out that these catalysts are colloidal or amorphous combinations of silica and alumina, although there is some evidence that a part at least of the alumina may be crystalline.

Another important class of silica gel catalysts are catalysts which contain a major proportion of silica and an active hydrated metallic fluoride which is stable and non-volatile up to temperatures of about 1200° F. As metallic fluorides for use in such catalysts, there may be mentioned the fluorides of aluminum, chromium, magnesium, barium, calcium, cerium, copper, iron, manganese, nickel, strontium, uranium, and bismuth. The fluorides of aluminum and magnesium are of special interest. Important catalysts of this class contain silica, hydrated aluminum fluoride, magnesium fluoride or magnesia, and a small proportion of alumina. For the purposes of this invention, these catalysts may be regarded as a special type of silica-alumina catalyst.

The present application distinguishes from my co-pending application, Serial No. 521,974, filed February 11, 1944, for Catalyst manufacture. The latter application has to do with the specific method of drying extruded catalyst of the foregoing type containing a starch material.

Obviously many modifications and variations of the invention, as hereinbefore set forth, may be made without departing from the spirit and scope thereof, and therefore only such limitations should be imposed as are indicated in the appended claims.

I claim:

1. A process for the production of catalysts comprising at least a major proportion of an inorganic gel prepared by precipitation in aqueous solution in selected forms, which comprises mixing the inorganic catalyst gel while in the moist and hydrated state and before removal of water of hydration, with a starch material adapted to form a plastic composition with water in an amount corresponding to between 30 and 60 per cent of the dry weight of the catalyst gel to form a plastic mass, extruding the plastic mass into the selected forms, drying and calcining to remove said finely-divided, water-wettable organic material from said catalyst gel.

2. A process for the production of catalysts comprising a major proportion of silica gel and a minor proportion of alumina gel in selected forms, which comprises mixing a composition comprising a combination comprising a major proportion of hydrated silica gel and a minor resistant to breakage and has a somewhat higher crushing strength.

While various starches and flours may be used within the scope of the invention, and satisfactory results have been obtained with the use of corn starch, it has been found that ordinary commercial wheat flour is not only economical to use but produces catalysts which are especially active and which possess high resistance to crushing.

With respect to the proportions of organic material which are employed in accordance with the invention, the work which has been done in the development of the present invention has indicated that while silica-alumina gel catalysts can be prepared by extrusion techniques involving simply the extrusion of the moist catalyst gel, in the extrusion operation rearrangement of the particles of the gel takes place and the extruded product is a glassy material which may be initially active, but which cannot be satisfactorily regenerated by conventional methods. After regeneration, such a catalyst is found to contain a relatively large amount of deposited carbon. When using 20 per cent starch in the preparation of the catalyst, it has been found that substantially complete regeneration is possible, but that there still remains a small amount of carbon in the regenerated material. By the use of at least 30 per cent of a starch, it has been found that a catalyst can be produced which is capable of as effective regeneration as the relatively expensive catalyst pellets prepared by the tableting procedure. Accordingly, it is preferred to employ at least 30 per cent of a starch in practicing the present process.

With respect to the maximum amount of a starch that can be used, catalysts of satisfactory activity have been obtained with the use of 100 per cent of a starch. However, structurally, the catalysts were inferior to catalysts containing not over 60 per cent of a starch. Since there is no apparent advantage in the use of a greater amount, it is preferred to use not more than 60 per cent of a starch. As will be apparent as the description proceeds, taking all factors into account, it is believed that the use of about 40 per cent of a starch produces the most satisfactory results.

The invention will be understood more fully by reference to the following specific examples which illustrate preferred ways of practicing the invention:

*Example 1*

45 pounds of commercial sodium silicate (containing about 28.5 per cent $SiO_2$ and 8 percent $Na_2O$) are dissolved in about 45 gallons of water. A dilute solution of hydrochloric acid is added to the resulting solution until the solution is faintly acid to phenolphthalein. As a result of this treatment, a silica gel is formed which is broken down by stirring. Then, while agitating, additional hydrochloric acid is added until the solution is acid to Congo red. Thereafter, dilute ammonium hydroxide is added to the solution until neutral to litmus. The neutral product is filtered and washed with water, an aqueous solution of aluminum chloride, and again with water. The washed silica gel is then mixed into a solution containing about 8 pounds of aluminum chloride ($AlCl_3 \cdot 6H_2O$) in 45 gallons of water. A 1 to 1 solution of concentrated ammonium hydroxide and water is added to the mixture until barely alkaline to litmus and then the pH is adjusted until slightly acid to litmus by adding hydrochloric acid. The slurry is then filtered and the filter cake obtained is washed with water until free from sodium as shown by the uranyl acetate test applied to the filtrate.

The resulting filter cake comprising hydrated alumina and silica gels in combination is then placed in a muller and a quantity of corn starch or wheat flour corresponding to 30 to 60 per cent by weight of the dry catalyst gel is added, and the mass is mulled until a semi-plastic, substantially homogeneous mixture is obtained. This mixture is then placed in a continuous extruder and is extruded into the desired shapes such as pellets or rings. While extruding, the extruded strings are broken into the desired lengths to form the catalyst particles. These particles are then dried and calcined in the presence of air at a temperature of from 1200 to 1500° F. until all carbonaceous material has been removed.

When the semi-plastic mixture is extruded into ring form a special drying technique is preferably employed in order to reduce the time of drying and at the same time to eliminate or reduce breakage during the drying operation. The rings are dried in an oven at a convenient temperature in the neighborhood of 200° F. while maintaining a relative humidity of above 20 per cent. The shapes are dried until dry to the touch, the specific time of drying being dependent upon the particular conditions maintained. For example, at a temperature of 190° F. and at a relative humidity of 50 per cent, the rings are dried for from 12 to 24 hours. Effective calcining is accomplished by maintaining the dried rings at a temperature of about 1500° F. in the presence of an oxygen-containing gas for about 16 hours.

*Example II*

A hydrated sodium-free catalyst gel comprising silica and alumina is prepared as described under Example I. This gel is removed from the filter and is then reslurried in the minimum amount of water to give a mushy consistency. Separately, a starch slurry is prepared, using corn starch or wheat flour in proportions within the range of from 20 to 100 per cent of the weight of the dry catalyst gel, by mixing the starch with hot water, cooking the mixture by directly injecting live steam for one hour, and cooling. The cooked slurry is then mixed with the catalyst gel slurry and the combined slurries are centrifuged to a wet filter cake. The wet cake is removed from the filter and is pressed through a 4-mesh screen. A clean bag is placed in the centrifugal filter and the filter cake is recharged and is filtered until the water no longer comes out in a stream. It has been found that the specific water content of the filter cake is not critical but should be such that when a portion of the semi-plastic cake is pressed in the hand, it will cohere. The cake should not be so wet as to be semi-fluid or sticky. The filter cake is then removed from the filter and is again pressed through a 4-mesh screen. Thereafter, the gel-starch mixture is fed to the extrusion machine and is extruded in the form of a tube. The die of the extrusion machine may be at room temperature or may be heated; for example, to about 150° F. As the tube issues from the extrusion machine, it is broken into the desired lengths.

The extruded rings may be dried as described under Example I or they may be predried at atmospheric conditions for an extended period of time, two or three weeks usually being satisfactory, since substantial breakage due to strains in the rings is avoided. The predried rings are then oven-dried at about 225° to 250° F. for about 12 hours and are then calcined. The calcination is carried out by heating the rings slowly to about 1450° F. while passing air in contact with the rings at a rate of about 0.5 cu. ft. per hour per pound of catalyst. The calcination requires from 12 to 24 hours.

Catalysts prepared as described in Example II were tested as to initial activity as cracking catalysts and as to activity after regeneration. A virgin Oklahoma gas oil was cracked in the tests which were carried out by passing vapors of the gas oil at a temperature of about 950° F. into contact with the catalyst contained in a reactor also maintained at a temperature of about 950° F. at a space velocity of about 4:1 (4 liquid volumes of gas oil per volume of catalyst per hour). The products were collected and separated and the yields of 400° F. E. P. naphtha, total $C_4$ retention, were determined in terms of volume per cent basis charge.

Also, a separate investigation was made with respect to the breakage of the rings which took place before and during the calcining. The rings were about 3/8 inch in diameter and about 3/8 inch in length and had a wall thickness of about 3/32 inch.

The results obtained are given in the following table:

| Per cent by weight starch or flour in dry catalyst gel | Naphtha yield, volume per cent | | Per cent by weight whole rings after calcining | Per cent by weight of catalyst product-rings and pieces larger than 4-mesh |
|---|---|---|---|---|
| | Initial | Regenerated | | |
| 20% starch | 20.2 | 18.7 | 90.5 | 96.0 |
| 30% starch | 21.2 | 21.3 | 93.4 | 96.0 |
| 60% starch | 23.3 | 26.1 | 88.1 | 94.5 |
| 70% starch | 27.7 | 29.5 | 97.3 | 98.4 |
| 100% starch | 25.8 | 26.2 | 44.3 | 56.5 |
| 20% flour | 24.3 | 21.9 | 84.9 | 94.1 |
| 30% flour | 26.5 | 26.2 | 87.6 | 94.1 |
| 40% flour | 25.5 | 24.4 | 95.3 | 98.5 |
| 50% flour | 24.0 | 23.7 | 96.2 | 98.3 |
| 60% flour | 27.7 | 26.0 | 93.6 | 97.1 |
| 70% flour | 24.5 | 23.5 | 96.0 | 98.0 |

These results show that the catalysts possess excellent activity and that they are capable of entirely satisfactory regeneration. While the catalysts containing 20% starch or flour are satisfactory, their activity after regeneration is less in proportion to their initial activity than similar catalysts containing a greater quantity of organic material. In continuous runs in which the yields obtained were comparable to those given above, using catalysts containing 30% starch and 40% and 70% flour, it was found that during use, the catalyst containing 70% flour tended to produce fines to a greater extent than the other catalysts. On the basis of all of these results, it is preferred to use about 40% of a starch, preferably wheat flour, in practicing the present process.

It will be understood that the foregoing examples are merely illustrative of the invention and that the invention may be carried into effect in other ways. Thus, other inorganic gel catalysts, that is catalysts which are predominantly inorganic gels, may be substituted for the catalysts treated in the example, since the physical characteristics of the catalysts, rather than the specific chemical constituents are believed to be determinative of whether the catalysts may be prepared by the present process. The more important silica gel catalysts also contain alumina and may contain another catalytic material, as previously indicated. In such catalysts, the silica preferably constitutes a major proportion of the catalysts, and in the more valuable catalysts, the silica constitutes at least 70 per cent and may constitute up to 99 per cent by weight of the catalyst mixture, although 94 per cent is the preferred upper limit.

As other substances which may be used in silica gel catalysts in place of or in addition to the alumina and/or the zirconia, there may be mentioned a wide variety of metallic oxides which have been disclosed in the literature on the subject, including the oxides of metals from groups II and VIII of the periodic table, the particular oxide or oxides selected being dependent upon the reaction in which the catalyst is to be used.

In connection with the silica-alumina catalysts with or without another metal oxide, it may be of advantage to point out that these catalysts are colloidal or amorphous combinations of silica and alumina, although there is some evidence that a part at least of the alumina may be crystalline.

Another important class of silica gel catalysts are catalysts which contain a major proportion of silica and an active hydrated metallic fluoride which is stable and non-volatile up to temperatures of about 1200° F. As metallic fluorides for use in such catalysts, there may be mentioned the fluorides of aluminum, chromium, magnesium, barium, calcium, cerium, copper, iron, manganese, nickel, strontium, uranium, and bismuth. The fluorides of aluminum and magnesium are of special interest. Important catalysts of this class contain silica, hydrated aluminum fluoride, magnesium fluoride or magnesia, and a small proportion of alumina. For the purposes of this invention, these catalysts may be regarded as a special type of silica-alumina catalyst.

The present application distinguishes from my co-pending application, Serial No. 521,974, filed February 11, 1944, for Catalyst manufacture. The latter application has to do with the specific method of drying extruded catalyst of the foregoing type containing a starch material.

Obviously many modifications and variations of the invention, as hereinbefore set forth, may be made without departing from the spirit and scope thereof, and therefore only such limitations should be imposed as are indicated in the appended claims.

I claim:

1. A process for the production of catalysts comprising at least a major proportion of an inorganic gel prepared by precipitation in aqueous solution in selected forms, which comprises mixing the inorganic catalyst gel while in the moist and hydrated state and before removal of water of hydration, with a starch material adapted to form a plastic composition with water in an amount corresponding to between 30 and 60 per cent of the dry weight of the catalyst gel to form a plastic mass, extruding the plastic mass into the selected forms, drying and calcining to remove said finely-divided, water-wettable organic material from said catalyst gel.

2. A process for the production of catalysts comprising a major proportion of silica gel and a minor proportion of alumina gel in selected forms, which comprises mixing a composition comprising a combination comprising a major proportion of hydrated silica gel and a minor proportion of hydrated alumina gel, said combination being prepared by precipitation in aqueous solution, while moist and before removing water of hydration, with a starch material adapted to form a plastic composition with water in an amount corresponding to between 30 and 60 per cent of the dry weight of the catalyst gel to form a plastic mass, extruding the plastic mass into the selected forms, drying and calcining to remove said finely-divided, water-wettable organic material from said catalyst gel.

3. A process for the production of catalysts comprising a major proportion of silica gel and a minor proportion of alumina gel in selected forms, which comprises mixing a composition comprising a combination comprising a major proportion of hydrated silica gel and a minor proportion of hydrated alumina gel, said combination being prepared by precipitation in aqueous solution, while moist and before removing water of hydration, with corn starch in an amount corresponding to between 30 and 60 per cent of the dry weight of the catalyst gel to form a plastic mass, extruding the plastic mass into the selected forms, drying and calcining to remove said corn starch from said catalyst gel.

4. A process for the production of catalysts comprising a major proportion of silica gel and a minor proportion of alumina gel in selected forms, which comprises mixing a composition comprising a combination comprising a major proportion of hydrated silica gel and a minor proportion of hydrated alumina gel, said combination being prepared by precipitation in aqueous solution, while moist and before removing water of hydration, with wheat flour in an amount corresponding to between 30 and 60 per cent of the dry weight of the catalyst gel to form a plastic mass, extruding the plastic mass into the selected forms, drying and calcining to remove said wheat flour from said catalyst gel.

5. A process for the production of catalysts comprising at least a major proportion of an inorganic gel prepared by precipitation in aqueous solution in selected forms, which comprises mulling the inorganic gel while moist and before removal of water of hydration, with a dry, finely-divided starch in an amonut corresponding to between 30 and 60 per cent of the dry weight of the catalyst gel until a substantially homogeneous plastic mass is formed, extruding the plastic mass into the selected forms, drying and calcining to remove said starch from said catalyst gel.

6. A process for the production of catalysts comprising a major proportion of a silica gel and a minor proportion of alumina gel in ring form, which comprises mulling a composition composed predominantly of a combination comprising a major proportion of hydrated silica gel and a minor proportion of hydrated alumina gel, said gels being prepared by precipitation in aqueous solution, while moist and before removal of water of hydration, with a dry, finely-divided starch in an amount corresponding to at least 30 per cent of the dry weight of the catalyst gel until a substantially homogeneous plastic mass is formed, extruding the plastic mass into ring form, drying the rings, and calcining to remove said starch from said catalyst gel.

7. A process for the production of catalysts comprising a major proportion of a silica gel and a minor proportion of alumina gel in ring form, which comprises mulling a composition composed predominantly of a combination comprising a major proportion of hydrated silica gel and a minor proportion of hydrated alumina gel, said gels being prepared by precipitation in aqueous solution, while moist and before removal of water of hydration, with dry flour in an amount corresponding to 30 to 60 per cent of the dry weight of the catalyst gel until a substantially homogeneous plastic mass is formed, extruding the plastic mass into ring form, drying the rings, and calcining to remove said flour from said catalyst gel.

8. A process for the production of silica-alumina gel catalysts in the form of rings, which comprises mulling a moist, hydrated composite gel comprising hydrated silica and alumina gels prepared by precipitating hydrated silica gel from a solution of a silicate and precipitating hydrated alumina gel in the presence of the hydrated silica gel, with dry, uncooked flour in an amount corresponding to about 40 per cent of the dry weight of the catalyst gel until a substantially homogeneous plastic mass is formed, extruding the plastic mass into ring form, drying the rings, and calcining to remove said flour from said catalyst gel.

GEORGE H. KEATING.

---

Certificate of Correction

Patent No. 2,408,215.    September 24, 1946.

GEORGE H. KEATING

It is hereby certified that error appears in the printed specification of the above numbered patent requiring correction as follows: Column 8, line 15, for the word "and" read *to*; and that the said Letters Patent should be read with this correction therein that the same may conform to the record of the case in the Patent Office.

Signed and sealed this 26th day of November, A. D. 1946.

[SEAL]

LESLIE FRAZER,
*First Assistant Commissioner of Patents.* proportion of hydrated alumina gel, said combination being prepared by precipitation in aqueous solution, while moist and before removing water of hydration, with a starch material adapted to form a plastic composition with water in an amount corresponding to between 30 and 60 per cent of the dry weight of the catalyst gel to form a plastic mass, extruding the plastic mass into the selected forms, drying and calcining to remove said finely-divided, water-wettable organic material from said catalyst gel.

3. A process for the production of catalysts comprising a major proportion of silica gel and a minor proportion of alumina gel in selected forms, which comprises mixing a composition comprising a combination comprising a major proportion of hydrated silica gel and a minor proportion of hydrated alumina gel, said combination being prepared by precipitation in aqueous solution, while moist and before removing water of hydration, with corn starch in an amount corresponding to between 30 and 60 per cent of the dry weight of the catalyst gel to form a plastic mass, extruding the plastic mass into the selected forms, drying and calcining to remove said corn starch from said catalyst gel.

4. A process for the production of catalysts comprising a major proportion of silica gel and a minor proportion of alumina gel in selected forms, which comprises mixing a composition comprising a combination comprising a major proportion of hydrated silica gel and a minor proportion of hydrated alumina gel, said combination being prepared by precipitation in aqueous solution, while moist and before removing water of hydration, with wheat flour in an amount corresponding to between 30 and 60 per cent of the dry weight of the catalyst gel to form a plastic mass, extruding the plastic mass into the selected forms, drying and calcining to remove said wheat flour from said catalyst gel.

5. A process for the production of catalysts comprising at least a major proportion of an inorganic gel prepared by precipitation in aqueous solution in selected forms, which comprises mulling the inorganic gel while moist and before removal of water of hydration, with a dry, finely-divided starch in an amonut corresponding to between 30 and 60 per cent of the dry weight of the catalyst gel until a substantially homogeneous plastic mass is formed, extruding the plastic mass into the selected forms, drying and calcining to remove said starch from said catalyst gel.

6. A process for the production of catalysts comprising a major proportion of a silica gel and a minor proportion of alumina gel in ring form, which comprises mulling a composition composed predominantly of a combination comprising a major proportion of hydrated silica gel and a minor proportion of hydrated alumina gel, said gels being prepared by precipitation in aqueous solution, while moist and before removal of water of hydration, with a dry, finely-divided starch in an amount corresponding to at least 30 per cent of the dry weight of the catalyst gel until a substantially homogeneous plastic mass is formed, extruding the plastic mass into ring form, drying the rings, and calcining to remove said starch from said catalyst gel.

7. A process for the production of catalysts comprising a major proportion of a silica gel and a minor proportion of alumina gel in ring form, which comprises mulling a composition composed predominantly of a combination comprising a major proportion of hydrated silica gel and a minor proportion of hydrated alumina gel, said gels being prepared by precipitation in aqueous solution, while moist and before removal of water of hydration, with dry flour in an amount corresponding to 30 to 60 per cent of the dry weight of the catalyst gel until a substantially homogeneous plastic mass is formed, extruding the plastic mass into ring form, drying the rings, and calcining to remove said flour from said catalyst gel.

8. A process for the production of silica-alumina gel catalysts in the form of rings, which comprises mulling a moist, hydrated composite gel comprising hydrated silica and alumina gels prepared by precipitating hydrated silica gel from a solution of a silicate and precipitating hydrated alumina gel in the presence of the hydrated silica gel, with dry, uncooked flour in an amount corresponding to about 40 per cent of the dry weight of the catalyst gel until a substantially homogeneous plastic mass is formed, extruding the plastic mass into ring form, drying the rings, and calcining to remove said flour from said catalyst gel.

GEORGE H. KEATING.

---

Certificate of Correction

Patent No. 2,408,215.　　　　　　　　　　　　　　September 24, 1946.

GEORGE H. KEATING

It is hereby certified that error appears in the printed specification of the above numbered patent requiring correction as follows: Column 8, line 15, for the word "and" read *to*; and that the said Letters Patent should be read with this correction therein that the same may conform to the record of the case in the Patent Office.

Signed and sealed this 26th day of November, A. D. 1946.

[SEAL]

LESLIE FRAZER,
*First Assistant Commissioner of Patents.*